(12) United States Patent
Zachariah et al.

(10) Patent No.: US 12,148,016 B2
(45) Date of Patent: Nov. 19, 2024

(54) COMPUTER-IMPLEMENTED BIDDING METHOD, COMPUTER EQUIPMENT AND STORAGE MEDIUM

(71) Applicant: ANHEUSER-BUSCH INBEV (CHINA) CO., LTD., Shanghai (CN)

(72) Inventors: Manion Zachariah, Shanghai (CN); Pushp Shashank, Shanghai (CN); Bhatia Madhur, Shanghai (CN); Suri Himanshu, Shanghai (CN); Rongrong Zhou, Shanghai (CN); Xiaomin Ding, Shanghai (CN)

(73) Assignee: ANHEUSER-BUSCH INBEV (CHINA) CO., LTD., Shanghai (CN)

( * ) Notice: Subject to any disclaimer, the term of this patent is extended or adjusted under 35 U.S.C. 154(b) by 0 days.

(21) Appl. No.: 17/615,108

(22) PCT Filed: Sep. 23, 2021

(86) PCT No.: PCT/CN2021/119768
§ 371 (c)(1),
(2) Date: Nov. 30, 2021

(87) PCT Pub. No.: WO2023/015679
PCT Pub. Date: Feb. 16, 2023

(65) Prior Publication Data
US 2023/0351463 A1      Nov. 2, 2023

(30) Foreign Application Priority Data
Aug. 13, 2021   (CN) .................. 202110928542.5

(51) Int. Cl.
G06N 20/00      (2019.01)
G06Q 30/0601    (2023.01)
G06Q 30/08      (2012.01)

(52) U.S. Cl.
CPC ......... G06Q 30/0611 (2013.01); G06N 20/00 (2019.01); G06Q 30/08 (2013.01)

(58) Field of Classification Search
None
See application file for complete search history.

(56) References Cited

U.S. PATENT DOCUMENTS

| 8,266,009 B1 | 9/2012 | Devlin et al. |
| 2002/0082977 A1 | 6/2002 | Hammond et al. |

(Continued)

FOREIGN PATENT DOCUMENTS

| CN | 112396211 A | 2/2021 |
| CN | 112464635 A | 3/2021 |

(Continued)

OTHER PUBLICATIONS

Liudmila Prokhorenkova, et al., CatBoost: unbiased boosting with categorical features, 32nd Conference on Neural Information Processing Systems (NeurIPS 2018), 2018, pp. 1-23.

*Primary Examiner* — David R Vincent
(74) *Attorney, Agent, or Firm* — Bayramoglu Law Ofices LLC

(57) ABSTRACT

A computer-implemented bidding method, computer equipment and a storage medium are provided. The computer-implemented bidding method includes: training a CatBoost regression model through a historical bidding data set, where the historical bidding data set includes bidding configuration parameters as an input of the model and a difference between a first quote and a final quote as an output of the model; and inputting current basic bidding parameters into the trained CatBoost regression model, and outputting values of optimized bidding configuration parameters to configure bidding rules for bidding participants. The computer-implemented bidding method can help a purchaser to (Continued)

Training a CatBoost regression model through a historical bidding data set, where the historical bidding data set comprises bidding configuration parameters as an input of the model and a difference between a first quote and a final quote as an output of the model; — S10

Inputting current basic bidding parameters into the trained CatBoost regression model, and outputting values of optimized bidding configuration parameters to configure bidding rules for bidding participants. — S20 purchase a required product at a relatively low price, thereby saving the purchase cost.

20 Claims, 3 Drawing Sheets

(56) References Cited

U.S. PATENT DOCUMENTS

2003/0236734 A1 12/2003 Guler et al.
2017/0103451 A1 4/2017 Alipov et al.

FOREIGN PATENT DOCUMENTS

CN 112990281 A 6/2021
WO 2019143542 A1 7/2019

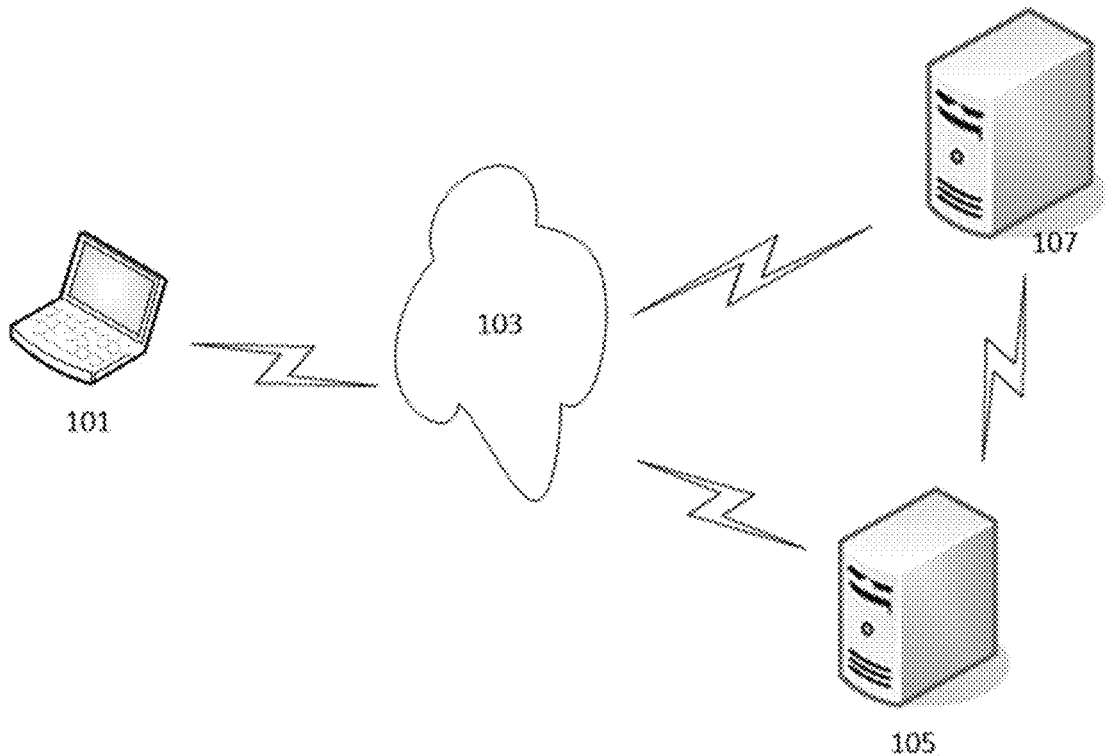

FIG. 1

Training a CatBoost regression model through a historical bidding data set, where the historical bidding data set comprises bidding configuration parameters as an input of the model and a difference between a first quote and a final quote as an output of the model; — S10

Inputting current basic bidding parameters into the trained CatBoost regression model, and outputting values of optimized bidding configuration parameters to configure bidding rules for bidding participants. — S20

FIG. 2

Name of bidding object

| Computer |

Bidding place

| APAC |

Number of bidding participants

| 5 |

Number of bidding participants who do not offer a first quote

| 2 |

Number of bidding objects

| 10 |

First quote

| 50000 |

Preset budget

| 45000 |

Submit

FIG. 3

COMPUTER-IMPLEMENTED BIDDING METHOD, COMPUTER EQUIPMENT AND STORAGE MEDIUM

CROSS REFERENCE TO THE RELATED APPLICATIONS

This application is the national phase entry of International Application No. PCT/CN2021/119768, filed on Sep. 23, 2021, which is based upon and claims priority to Chinese Patent Application No. 202110928542.5, filed on Aug. 13, 2021, the entire contents of which are incorporated herein by reference.

TECHNICAL FIELD

The present invention relates to the field of bidding, and more particularly, to a computer-implemented bidding method, computer equipment and a storage medium.

BACKGROUND

In the trading market, a buyer or seller publishes the brand, specification, delivery location, delivery time, quantity, reserve price and other information of a demanded/supplied commodity through a spot bidding trading system. Eligible competitors increase or decrease their prices on their own, and in accordance with the principle of "price priority", a transaction is completed at the highest buying price or the lowest selling price within a specified time. Both parties to the transaction sign an electronic purchase/sale contract through the trading market, and perform physical delivery according to the contract. This trading method is called bidding.

For example, in a purchase scenario, the purchaser hopes that the final price is as low as possible. On the contrary, in an auction scenario, the auctioneer hopes that the final price is as high as possible. However, there are many factors that affect bidding, such as the type and duration of bidding, which makes it hard to reach the final price expected by the purchaser/auctioneer.

SUMMARY

In order to solve the above-mentioned technical problems, an objective of the present invention is to provide a computer-implemented bidding method, computer equipment and a storage medium.

In order to achieve the above objective, the present invention adopts the following technical solutions:

A first aspect of the present invention provides a computer-implemented bidding method, including:
training a CatBoost regression model through a historical bidding data set, where the historical bidding data set includes bidding configuration parameters as an input of the model and a difference between a first quote and a final quote as an output of the model; and
inputting current basic bidding parameters into the trained CatBoost regression model, and outputting values of optimized bidding configuration parameters to configure bidding rules for bidding participants.

In a specific example, the bidding configuration parameters are X $(x_1, x_2, x_i, x_{i+1}, \ldots, x_N)$, where $1 \leq i \leq N$, N is the number of the bidding configuration parameters, where, $x_1$ to $x_i$ are basic bidding parameters, which at least include information of the bidding participants and information of a bidding object; and
$x_{i+1}$ to $x_N$ are optimizable bidding parameters, which at least include a bidding duration and a change step size for each quote.

In a specific example, the information of the bidding participants includes one or more of the following: a number of the bidding participants, identity information of each of the bidding participants, a first quote offered by each of the bidding participants, and a number of bidding participants who do not offer a first quote; and
the information of the bidding object includes one or more of the following: a name of the bidding object, a bidding place, the number of bidding objects and a preset budget.

In a specific example, the optimizable bidding parameters further include one or more of the following: a parameter for characterizing whether the bidding participants are allowed to see each other's rankings, a parameter for characterizing whether to allow a delay in case of an unexpected situation, a parameter for characterizing a time of the delay and a parameter for characterizing whether to display the lowest quote to the bidding participants.

In a specific example, the step of training the CatBoost regression model through the historical bidding data set includes:
dividing the historical bidding data set A into a training set B and a test set C, where A=B∪C, and each of the training set B and the test set C includes positive samples and negative samples; and proportions of the positive samples to the negative samples in the training set B and the test set C are identical;
training the CatBoost regression model through the training set B; and
verifying the CatBoost regression model through the test set C to obtain the trained CatBoost regression model.

In a specific example, the step of training the CatBoost regression model through the training set B includes:
evaluating weights of default parameters of the model to obtain a model parameter matrix by taking historical bidding configuration parameters as an input and a corresponding difference between a historical first quote and a historical final quote as an output, where parameters in the model parameter matrix are sorted in the descending order of weights.

In a specific example, the model parameter matrix includes one or more of the following: a learning rate (learning_rate), a maximum depth of a tree (max_depth), a maximum number of decision trees (iterations), an L2 regularization coefficient (l2_leaf_reg), a loss function (loss_function), a partition number of numerical features (border_count) and a partition number of categorical features (ctr_border_count).

In a specific example, the step of verifying the CatBoost regression model through the test set C to obtain the trained CatBoost regression model includes:
inputting the test set C into the regression model defined according to the model parameter matrix to obtain a predicted difference; and
analyzing, based on a fitness value of the CatBoost regression model, a relationship between the predicted difference and a historical bidding difference to obtain the trained CatBoost regression model, where the fitness value is an area under the curve (AUC), a mean square error (MSE) or a square of a coefficient of determination (R).

In a specific example, the step of inputting the current basic bidding parameters into the trained CatBoost regression model, and outputting the values of the optimized bidding configuration parameters includes:

obtaining all combinations of values of the bidding configuration parameters according to the input current basic bidding parameters;

taking each of the combinations as an input of the trained CatBoost regression model to obtain a corresponding difference between a first quote and a final quote; and comparing all corresponding differences between first quotes and final quotes to obtain a maximum difference, and obtaining values of the bidding configuration parameters corresponding to the maximum difference to be output as the values of the optimized bidding configuration parameters.

A second aspect of the present invention provides a computer-implemented bidding method, which includes:

receiving the values of the optimized bidding configuration parameters obtained according to the method described in the first aspect of the present invention; and in response to a bidding organizer's configuration action based on the values of the optimized bidding configuration parameters, displaying options of the bidding configuration parameters on a bidding participant interface of a bidding system, where the options only include the values of the optimized bidding configuration parameters.

A third aspect of the present invention provides computer equipment, which includes a memory, a processor, and a computer program stored in the memory and executable on the processor. The computer program is executed by the processor to implement the method described in the first aspect of the present invention.

A fourth aspect of the present invention provides a computer-readable storage medium, which stores a computer program. The program is executed by a processor to implement the method described in the first aspect of the present invention.

A fifth aspect of the present invention provides computer equipment, which includes a bidding management system. The bidding management system is configured for:

receiving the values of the optimized bidding configuration parameters obtained according to the method described in the first aspect of the present invention; and displaying the bidding configuration parameters on a bidding participant interface of a bidding management system, where values of the bidding configuration parameters are the values of the optimized bidding configuration parameters.

A sixth aspect of the present invention provides a computer-readable storage medium, which stores a computer program. The computer program is executed by a processor to implement the method described in the second aspect of the present invention.

A seventh aspect of the present invention provides a bidding system, which includes:

the computer equipment provided by the third aspect of the present invention; and the computer equipment provided by the fifth aspect of the present invention.

The present invention has the following advantages.

In the technical solutions of the present invention, the CatBoost regression model is trained through the historical bidding data set. Then, the current basic bidding parameters are input into the trained CatBoost regression model to obtain the values of the optimized bidding configuration parameters output by the model. The bidding rules for the bidding participants are configured according to the values of the optimized bidding configuration parameters, such that an auctioneer or a purchaser completes the bidding at a favorable price.

BRIEF DESCRIPTION OF THE DRAWINGS

The specific implementations of the present invention will be further described in detail below with reference to the drawings.

FIG. 1 is a schematic diagram of a hardware architecture of a method according to an embodiment of the present application.

FIG. 2 is a flowchart of a computer-implemented bidding method according to an embodiment of the present application.

FIG. 3 is a schematic diagram of a display interface for basic bidding parameters among bidding configuration parameters according to an embodiment of the present application.

DETAILED DESCRIPTION OF THE EMBODIMENTS

Figures 4, 5:
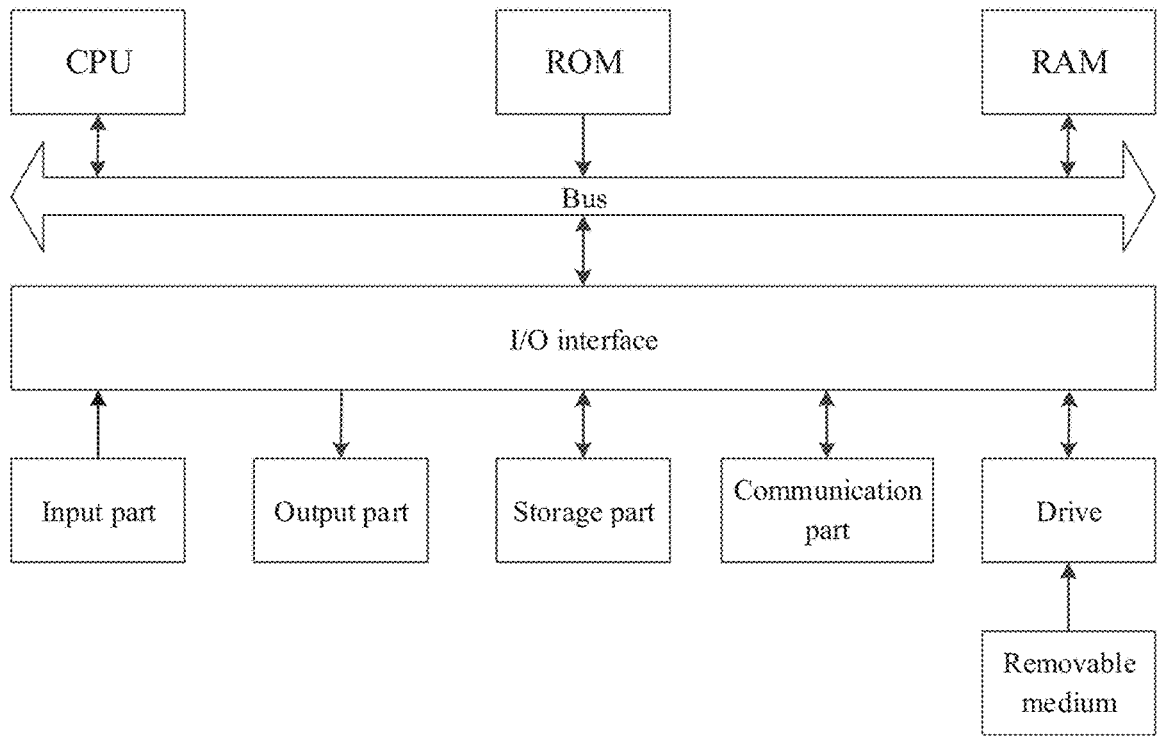
FIG. 4 is a schematic diagram of a display interface for optimizable bidding parameters among the bidding configuration parameters according to an embodiment of the present application.
FIG. 5 is a schematic diagram of a structure of a computer system for the method according to an embodiment of the present application.

To explain the present invention more clearly, the present invention will be further described with reference to the preferred embodiments and drawings. The same reference numerals in the drawings represent the same parts. It should be understood by those skilled in the art that the following detailed description is intended to be illustrative, rather than restrictive, and the scope of protection of the present invention should not be limited thereto.

An embodiment of the present invention is described by taking a purchase scenario as an example.

In a formal purchase process, a purchaser needs to create a bidding item through commercial purchase management software, such as an Ariba purchase management system. Specifically, before the creation of the bidding item, the business personnel of the purchaser and multiple potential suppliers (bidding participants) contact about a product and a first quote. The lowest first quote is called a best first quote, which is an initial set price for bidding.

Subsequently, the purchaser inputs account information (user name and password) on the user terminal 101 as shown in FIG. 1 to log into the purchase management system in the computer equipment 107 via the network 103, and inputs bidding information (such as the name of the product to be purchased), and supplier information (such as name, bank account and other information). In addition, the purchaser manually configures bidding configuration parameters, such as the type of purchase, and the specific value of bidding duration. After these parameters are configured, a bidding order is generated, and the system automatically sends the bidding order to corresponding suppliers. After receiving the bidding order, the suppliers log into the purchase management system through their respective accounts to bid according to a bidding date. The suppliers start bidding online from the first quote (more preferably, the best first quote) until the end of the bidding, and a supplier with the lowest quote wins the bid.

In the manual setting process of the bidding configuration parameters, due to the numerous parameters, the purchase parameters are often not optimized, resulting in the company completing the purchase process at an excessively high price.

Embodiment 1

In view of this, this embodiment of the present invention provides a computer-implemented bidding method. In this embodiment, the bidding method may be implemented through hardware architecture as shown in FIG. 1.

The computer equipment 105 is provided with a bidding configuration parameter optimization model. In this embodiment, a CatBoost regression model (CatBoostRegressor) based on a deep learning (DL) framework is used to optimize bidding configuration parameters. The model provides the optimized configuration parameters to a purchaser via the network 103, and the purchaser sets values of the optimized configuration parameters in the purchase management system in the computer equipment 107.

The network 103 is a medium for providing a communication link between the user terminal 101 and the computer equipment 105 and 107. The network 103 may have various connection types, for example, a wired or wireless communication link or a fiber-optic cable.

The user terminal 101 may be various electronic apparatuses with a display screen, including but not limited to a smart phone, a tablet computer, a portable laptop computer and a desktop computer.

The computer equipment 105 and 107 may be any apparatuses having a processor and a memory, such as servers.

It should be noted that the quantities of the user terminal, the network, and the computer equipment shown in FIG. 1 are only illustrative. Any quantities of user terminals, networks and servers may be provided according to implementation requirements.

The present invention provides a computer-implemented bidding method. In a specific example, the type of the product to be purchased may be a physical product, such as a digital product, a teaching supply, a communication apparatus, furniture or a home appliance, or a service, such as a legal service, which is not limited herein.

As shown in FIG. 2, the method includes the following steps.

S10: a CatBoost regression model is trained through a historical bidding data set, where the historical bidding data set includes bidding configuration parameters as an input of the model and a difference between a first quote and a final quote as an output of the model.

In order to use the CatBoost regression model to make a prediction, it needs to be trained first.

The CatBoost regression model may be trained using any suitable data set. In this embodiment, the CatBoost regression model is trained through the historical bidding data set. The historical bidding data set includes the bidding configuration parameters as the input of the model and the difference between the first quote (the lowest value of the first quote is adopted if existing) and the final quote (the lowest value of the final quote is adopted if existing) as the output of the model.

In a possible implementation, there are N bidding configuration parameters, which are defined in the form of an N-dimensional vector, X ($x_1$, $x_2$, $x_i$, $x_{i+1}$, . . . , $x_N$), where $1 \leq i \leq N$.

Specifically, $x_1$ to $x_i$ are basic bidding parameters, which at least include information of a bidding object and information of bidding participants (suppliers).

In an example, the information of the bidding object includes one or more of the following: a name of the bidding object, a bidding place, the number of bidding objects and a preset budget.

In an example, the information of the bidding participants includes one or more of the following: the number of the bidding participants, identity information of each of the bidding participants, a first quote offered by each of the bidding participants, and the number of bidding participants who do not offer a first quote.

Specifically, $x_{i+1}$ to $x_N$ are optimizable bidding parameters, and, for example, include a bidding duration, and a change step size for each quote.

In a specific example, the historical bidding data may be acquired from the Internet, for example, by crawler technology.

However, the format of data acquired from the Internet is often irregular and does not conform to the format definition of the historical data. For example, the data format in various fields is inconsistent. In addition, these data, for example, may lack some key information (such as the final quote). Therefore, before training the model, the method further includes cleaning the acquired data.

Optionally, the missing information of each piece of historical data is completed. In a specific example, if the amount of missing information of certain historical data exceeds half, the historical data is deleted. If the amount of missing information of the historical data does not exceed half, the historical data is completed by using an average, a median or a row/column mode of the information of the historical data.

In another embodiment, the historical bidding data may be acquired from the purchaser who plans the purchase. For example, the purchaser transmits the historical bidding data of bidders participating in its past purchase project to the CatBoost model through the user terminal 101, so as to train the model. In this embodiment, the historical data for training the model is pertinent, especially in case that a bidding participant in the planned purchase has also participated in the bidding of the company's past purchase project. In this way, through the training of the model, the bidding habit of the bidding participant, such as the step size for each quote, can be acquired.

It should be noted here that the type of the bidding product in the historical bidding data set is not limited to the same product (such as computer) to be purchased. It may be other digital product, teaching supply, communication apparatus, furniture or home appliance. More preferably, the historical bidding data set includes a historical bidding data set of the bidding participant on other occasions for the product (such as computer) to be purchased.

In a specific example, 15000 pieces of historical bidding data are acquired to train the CatBoost regression model. The historical bidding data set includes, for example, 15000 sets of bidding configuration parameters. Each set of configuration parameters includes a total of 40 common bidding parameters, such as bidding duration, and is expressed as a 40-dimensional vector $X_j$ ($x_1$, $x_2$, $x_3$, $x_4$, $x_5$, $x_{5+1}$, . . . , $x_{40}$), where $x_1$ to $x_5$ are basic bidding parameters, and $x_6$ to $x_{40}$ are optimizable bidding parameters. A difference between a first quote and a final quote corresponding to $X_j$ ($x_1$, $x_2$, $x_3$, $x_4$, $x_5$, $x_{5+1}$, ..., $x_{40}$) is $Y_j$, where $1 \leq j \leq 15000$.

The 15000 sets of X ($x_1$, $x_2$, $x_3$, $x_4$, $x_5$, $x_{5+1}$, ..., $x_{40}$) are taken as an input of the CatBoost regression model, and the difference $Y_j$ between the first quote and the final quote corresponding to each set of X ($x_1$, $x_2$, $x_3$, $x_4$, $x_5$, $x_{5+1}$, ..., $x_{40}$) is taken as an output of the CatBoost regression model, so as to obtain a trained CatBoost regression model.

In a possible implementation, the step of training the CatBoost regression model through the historical bidding data set includes the following.

S100: the historical bidding data set A is divided into a training set B and a test set C, where A=B∪C, and each of the training set B and the test set C includes positive samples and negative samples; and proportions of the positive samples to the negative samples in the training set B and the test set C are identical.

In a specific example, the historical bidding data sets are classified according to the type of product, and a data set A of each type of product is divided into a training set B and a test set C. For example, 75% of the data set A of each type of product is taken as the training set B, and 25% of the data set A of each type of product is taken as the test set B. Each of the training set B and the test set C includes positive samples and negative samples, and the proportions of the positive samples to the negative samples in the training set B and the test set C are identical.

S105: the CatBoost regression model is trained through the training set B.

In a possible implementation, a model parameter matrix includes one or more of the following: a learning rate (learning_rate), a maximum depth of a tree (max_depth), a maximum number of decision trees (iterations), an L2 regularization coefficient (12_leaf_reg), a loss function (loss_function), a partition number of numerical features (border_count) and a partition number of categorical features (ctr_border_count).

The analysis of a large amount of data shows that for different bidding products and different bidding participants with different bidding habits, the weights of the parameters included in the model parameter matrix are different. The order of importance of the parameters directly affects the prediction accuracy of the model. In view of this, in a possible implementation, the step of training the CatBoost regression model through the training set B includes the following.

For each type of product in the historical bidding data, weights of default parameters of the CatBoost model are evaluated to obtain a model parameter matrix regarding the bidding product by taking the corresponding historical bidding configuration parameters as an input and the corresponding difference between a historical first quote and a historical final quote as an output, where parameters in the model parameter matrix are sorted in a descending order of weights.

Similarly, for each of the bidding participants in the historical bidding data, weights of default parameters of the CatBoost model are evaluated to obtain a model parameter matrix regarding the bidding participant by taking the corresponding historical bidding configuration parameters as an input and the corresponding difference between a historical first quote and a historical final quote as an output, where parameters in the model parameter matrix are sorted in a descending order of weights.

Further, the model parameter matrices obtained by the above two methods are merged to obtain a model parameter matrix regarding the bidding participant and the product, where the parameters in the model parameter matrix are sorted in a descending order of weights.

Specifically, in the embodiment of the present invention, $R^2$ is used as a weight ranking optimization parameter of the CatBoost regression model. According to the training data set, the default values of the model parameters (such as the parameters included in the model parameter matrix) are used for calculating to obtain an inversion value. $R^2$ is calculated based on a relationship between the inversion value as well as the predicted difference and a historical bidding difference. The values of the model parameters are then changed. The importance of the model parameters increases as the change in $R^2$ increases. The model parameters are sorted in the descending order of importance to construct an optimized model parameter matrix for subsequent calculations.

S110: the CatBoost regression model is verified through the test set C to obtain the trained CatBoost regression model.

In a possible implementation, the step of verifying the CatBoost regression model through the test set C to obtain the trained CatBoost regression model includes:
inputting the test set C into the regression model defined according to the model parameter matrix to obtain a predicted difference; and
analyzing, based on a fitness value of the CatBoost regression model, a relationship between the predicted difference and the historical bidding difference to obtain the trained CatBoost regression model, where the fitness value is an area under the curve (AUC), a mean square error (MSE) or a square of a coefficient of determination (R).

For example, taking $R^2$ as an example, a threshold, such as 0.9, may be set. Then the value of $R^2$ is calculated, and if the value of $R^2$ exceeds 0.9, it is considered that the CatBoost regression model is well trained, and a CatBoost regression model with the optimized model parameters is obtained.

S20: Current basic bidding parameters are input into the trained CatBoost regression model, and values of optimized bidding configuration parameters are output to configure bidding rules for bidding participants.

In an embodiment, this step includes:
S200: all combinations of values of the bidding configuration parameters are obtained according to the input current basic bidding parameters.

In a specific example, a purchaser needs to purchase 10 computers in the Asia Pacific (APAC) region. The purchaser inputs current basic bidding parameters on a visual interactive interface of the model (as shown in FIG. 3): name of bidding object: computer; bidding place: APAC; number of bidding participants: 5; number of bidding participants who do not offer a first quote: 2; number of bidding object: 10; first quote: 50000; and preset budget: 45000.

The staff of the purchaser clicks a submit button to send the current basic bidding parameters to the CatBoost model.

The combinations of the values of these 7 basic parameters and the remaining 33 parameters among the above 40 parameters except these 7 basic parameters are enumerated. In other words, the values of the 7 basic parameters are determined, but each of the remaining 33 parameters has multiple options of values. For example, to characterize whether the bidding process allows a delay, there are two options, i.e., yes/no. To characterize the delay time, there are more options of values. To characterize whether bidding participants are allowed to see each other's rankings, there are two options, i.e., yes/no. To characterize how multiple bidding projects proceed, there are three options, i.e., parallel, serial and alternate. To characterize whether a bidding delay is allowed, there are two options, i.e., yes/no. To characterize the ranking of bidding participants allowed to trigger a delay, for example, if it is set to 3, the top 3 bidding participants are allowed to trigger a delay. To characterize the delay time, for example, it may be recorded in minutes. To characterize how long a delay is allowed before the end of the bidding, for example, it may be recorded in minutes. If a bidding participant ranked within the ranking of bidding participants allowed to trigger a delay makes a quote within this time period or a new quote appears within this time period, the delay is triggered and the delay lasts for the above delay time. To characterize whether to display leading quotes to all participants, there are two options, i.e., yes/no. The options of the values of these 33 parameters are selected, such that a variety of combinations including the values of the 40 bidding configuration parameters are formed.

S205: the trained CatBoost regression model outputs differences between corresponding first quotes and predicted final quotes based on the combinations.

S210: all the differences between the corresponding first quotes and predicted final quotes are compared to obtain a maximum difference, and obtain values of the bidding configuration parameters corresponding to the maximum difference to be output as the values of the optimized bidding configuration parameters.

As shown in FIG. 4, the optimized configuration parameters are displayed (partly) on the interactive interface of the model as follows:

Whether bidding participants are allowed to see each other's rankings: No;
Bidding duration: 20 minutes;
Step size for each quote: 10%;
How multiple bidding projects proceed: Serial;
Whether the bidding process allows a delay: Yes;
Ranking of bidding participants allowed to trigger a delay: 3;
Delay time: 5 minutes;
How long a delay is allowed before the end of bidding: 6 minutes; and
Whether to display leading quotes to all participants: Yes.

For example, the staff of the purchaser may export an Excel format file including the values of the optimized configuration parameters by clicking an output button on the interactive interface.

In the technical solutions of the present invention, the CatBoost regression model is trained through the historical bidding data set. Then, the current basic bidding parameters are input into the trained CatBoost regression model to obtain the values of the optimized bidding configuration parameters output by the model. The bidding rules for the bidding participants are configured according to the values of the optimized bidding configuration parameters, such that the purchaser completes the bidding at a favorable price.

Embodiment 2

The present invention provides a computer-implemented bidding method, which is implemented by the computer equipment 107 shown in FIG. 1, and includes the following.

S30: the values of the optimized bidding configuration parameters obtained according to the method of Embodiment 1 are received.

In a specific example, the staff of the purchaser imports the aforementioned Excel table into the Ariba purchase management system in the computer equipment 107, and inputs the basic bidding parameters into the purchase management system through the interactive interface (not shown).

S32: bidding configuration parameters are displayed on a bidding participant interface of a purchase management system, where values of the bidding configuration parameters are the values of the optimized bidding configuration parameters.

In this embodiment, the bidding participants participate in the bidding according to prescribed bidding rules. For example, bidding duration: 20 minutes; step size for each quote: 10%; the bidding participants are not allowed to see each other's rankings; multiple bidding projects proceed in series; the top 3 bidding participants are allowed to delay 5 minutes in the last 6 minutes of the 20 minutes; and all participants are allowed to see leading quotes. Finally, a bidding participant with the lowest quote wins the bid.

In the technical solutions of the present invention, the CatBoost regression model is trained through the historical bidding data set. Then, the current basic bidding parameters are input into the trained CatBoost regression model to obtain the values of the optimized bidding configuration parameters output by the model. The bidding rules for the bidding participants are configured according to the values of the optimized bidding configuration parameters, such that the purchaser completes the bidding at a favorable price.

Embodiment 3

The computer equipment 105 and 107 shown in FIG. 1 may include the architecture shown in FIG. 5, which is configured to implement the computer-implemented bidding methods provided by Embodiments 1 and 2, respectively. The architecture includes a central processing unit (CPU), which performs various suitable actions and processing according to a program stored in a read-only memory (ROM) or a program loaded from a storage part to a random access memory (RANI). Various programs and data required for operations of a computer system are further stored in the RAM. The CPU, the ROM and the RAM are connected to each other through a bus. An input/output (I/O) interface is also connected to the bus.

The following components are connected to the I/O interface: an input part including a keyboard, a mouse and others; an output part including a liquid crystal display (LCD), a loudspeaker and others; the storage part including a hard disk and others; and a communication part including a network interface card such as a local area network (LAN) card or a modem. The communication part performs communication processing through a network such as the Internet. A drive is also connected to the I/O interface as needed. A removable medium, such as a magnetic disk, an optical disk, a magneto-optical disk, or a semiconductor memory, is provided on the drive as needed, such that a computer program read therefrom is installed into the storage part as needed.

Particularly, according to this embodiment, the process described above with reference to the flowchart may be implemented as a computer software program. For example, this embodiment includes a computer program product including a computer program tangibly carried by a computer-readable medium. The computer program includes a program code for executing the method shown in the flowchart. In this embodiment, the computer program may be downloaded from a network through the communication part and installed, and/or be installed from the removable medium.

The flowcharts and schematic diagrams in the drawings illustrate the architecture, functions and operations of possible implementations of the system, method, and computer program product in this embodiment. Each block in the flowchart or schematic diagram may represent a module, a program segment or a part of code, and the module, the program segment or the part of code includes one or more executable instructions used to implement a specified logical function. It should also be noted that, in some alternative implementations, the functions marked in the blocks may occur in a different order from that marked in the drawings. For example, two successively shown blocks actually may be executed in parallel substantially, or may be executed in reverse order sometimes, depending on the functions involved. It should also be noted that each block in the flowchart and/or schematic diagram and combinations of the blocks in the flowchart and/or schematic diagram may be implemented by a dedicated hardware-based system for executing specified functions or operations, or may be implemented by a combination of dedicated hardware and computer instructions.

Embodiment 4

As another aspect, this embodiment further provides a non-volatile computer storage medium. The non-volatile computer storage medium may be included in the apparatus of the above embodiment, or may separately exist without being installed in the terminal. One or more programs are stored in the non-volatile computer storage medium When the one or more programs are executed by the apparatus shown in FIG. 5, the computer-implemented bidding method provided in Embodiment 1 or Embodiment 2 is implemented.

Those skilled in the art should understand that although the above embodiments are described in a purchase scenario, the teachings of the present invention may obviously be used in other bidding scenario, such as auction. In the auction scenario, the final price is the highest price, and the purchase system is replaced with a commercial auction system.

It should be noted that, in the description of the present invention, orientations or position relationships indicated by terms such as "upper" and "lower" are described based on the orientations or position relationships shown in the drawings. These terms are merely used to facilitate and simplify the description, rather than to indicate or imply that the mentioned apparatus or elements must have a specific orientation and must be constructed and operated in a specific orientation. Therefore, these terms should not be understood as a limitation to the present invention. Unless otherwise clearly specified and limited, terms such as "mounted", "connected with", and "connected to" should be understood in a broad sense. For example, a connection may be a fixed connection, a detachable connection, or an integrated connection; it may be a mechanical connection, or an electrical connection; it may be a direct connection, an indirect connection via an intermediate medium, or an intercommunication between two components. Those having ordinary skill in the art may understand specific meanings of the above terms in the present invention based on a specific situation.

It should be noted that, in the description of the present invention, relational terms such as first and second are merely used to distinguish one entity or operation from another entity or operation without necessarily requiring or implying any actual such relationship or order between such entities or operations. In addition, terms "include/comprise", "contain", or any other variations thereof are intended to cover a non-exclusive inclusion, so that a process, a method, an article, or an apparatus including a series of elements not only includes those elements, but also includes other elements that are not explicitly listed, or also includes inherent elements of the process, the method, the article, or the apparatus. In case there are no more restrictions, an element limited by the statement "include/comprise a . . . " does not exclude the presence of additional identical elements in the process, the method, the article, or the apparatus that includes the element.

Apparently, the above embodiments of the present invention are merely illustrative of the present invention, rather than to limit the implementations of the present invention. Those skilled in the art may make changes or variations in other forms based on the above description. It is not possible to give an exhaustive list of all the implementations herein, but all obvious changes and variations derived from the technical solutions of the present invention shall fall within the scope of protection of the present invention.

What is claimed is:

1. A computer-implemented bidding method, comprising:
    training a CatBoost regression model through a historical bidding data set to obtain a trained CatBoost regression model, wherein the CatBoost regression model and the trained CatBoost regression model are deep learning (DL) regression models, wherein the historical bidding data set comprises bidding configuration parameters as an input of the CatBoost regression model and a difference between a first quote and a final quote as an output of the CatBoost regression model; and
    inputting current basic bidding parameters into the trained CatBoost regression model, and outputting values of optimized bidding configuration parameters to configure bidding rules for bidding participants, such that an auctioneer or a purchaser completes the bidding at a favorable price;
    wherein the bidding configuration parameters are X ($x_1$, $x_2$, $x_i$, $x_{i+1}$, . . . , $x_N$), wherein $1 \leq i \leq N$, N is a number of the bidding configuration parameters;
    wherein $x_1$ to $x_i$ are basic bidding parameters, wherein the basic bidding parameters comprise information of the bidding participants and information of a bidding object; and
    $x_{i+1}$ to $x_N$ are optimizable bidding parameters, wherein the optimizable bidding parameters comprise a bidding duration, and a change step size for each quote;
    wherein the step of training the CatBoost regression model through the historical bidding data set comprises:
        dividing the historical bidding data set defined as A into a training set defined as B and a test set defined as C, wherein $A = B \cup C$, and each of the training set and the test set comprises positive samples and negative samples; and proportions of the positive samples to the negative samples in the training set and the test set are identical;
        training the CatBoost regression model through the training set; and
        verifying the CatBoost regression model through the test set to obtain the trained CatBoost regression model;
    wherein the step of training the CatBoost regression model through the training set comprises:

for a given product, evaluating first weights of default parameters of the CatBoost regression model to obtain a first model parameter matrix for the given product by taking first historical bidding configuration parameters as an input and a corresponding difference between a first historical first quote and a first historical final quote as an output, wherein parameters in the first model parameter matrix are sorted in a descending order of the first weights, for a given bidding participant, evaluating second weights of default parameters of the CatBoost regression model to obtain a second model parameter matrix for the given bidding participant by taking second historical bidding configuration parameters as an input and a corresponding difference between a second historical first quote and a second historical final quote as an output, wherein parameters in the second model parameter matrix are sorted in a descending order of the second weights, merging the first model parameter matrix and the second model parameter matrix to obtain a merged model parameter matrix, wherein the trained CatBoost regression model is configured to determine said optimized bidding configuration parameters based on the merged model parameter matrix.

2. The computer-implemented bidding method according to claim 1, wherein when an amount of missing information of certain historical data exceeds half, the historical data is deleted; when the amount of missing information of the historical data does not exceed half, the historical data is completed by using an average, a median or a row/column mode of the information of the historical data.

3. The computer-implemented bidding method according to claim 2, wherein the information of the bidding participants comprises at least one selected from the group consisting of a number of the bidding participants, identity information of each of the bidding participants, a first quote offered by each of the bidding participants, and a number of bidding participants without offering a first quote; and the information of the bidding object comprises at least one selected from the group consisting of a name of the bidding object, a bidding place, a number of bidding objects and a preset budget.

4. The computer-implemented bidding method according to claim 2, wherein the optimizable bidding parameters further comprise at least one selected from the group consisting of a parameter for characterizing whether the bidding participants are allowed to see each other's rankings, a parameter for characterizing whether to allow a delay in case of an unexpected situation, a parameter for characterizing a time of the delay and a parameter for characterizing whether to display a lowest quote to the bidding participants.

5. The computer-implemented bidding method according to claim 1, wherein the model parameter matrix comprises at least one selected from the group consisting of a learning rate (learning_rate), a maximum depth of a tree (max_depth), a maximum number of decision trees (iterations), an L2 regularization coefficient (l2 leaf_reg), a loss function (loss_function), a partition number of numerical features (border_count) and a partition number of categorical features (ctr_border_count).

6. The computer-implemented bidding method according to claim 5, wherein the step of verifying the CatBoost regression model through the test set to obtain the trained CatBoost regression model comprises:

inputting the test set into the CatBoost regression model defined according to the model parameter matrix to obtain a predicted difference; and analyzing, based on a fitness value of the CatBoost regression model, a relationship between the predicted difference and a historical bidding difference to obtain the trained CatBoost regression model, wherein the fitness value is an area under the curve (AUC), a mean square error (MSE) or a square of a coefficient of determination (R).

7. The computer-implemented bidding method according to claim 1, wherein the step of inputting the current basic bidding parameters into the trained CatBoost regression model, and outputting the values of the optimized bidding configuration parameters comprises:

obtaining all combinations of values of the bidding configuration parameters according to the current basic bidding parameters;

outputting, by the trained CatBoost regression model, differences between corresponding first quotes and predicted final quotes based on the combinations; and comparing all the differences between the corresponding first quotes and predicted final quotes to obtain a maximum difference, and obtaining values of the bidding configuration parameters corresponding to the maximum difference to be output as the values of the optimized bidding configuration parameters.

8. A computer-implemented bidding method, comprising:
receiving the values of the optimized bidding configuration parameters obtained by the computer-implemented bidding method according to claim 1; and displaying the bidding configuration parameters on a bidding participant interface of a purchase management system, wherein values of the bidding configuration parameters are the values of the optimized bidding configuration parameters.

9. Computer equipment, comprising a memory and a processor, wherein a computer program is stored in the memory, and the computer program is executed by the processor to implement the computer-implemented bidding method according to claim 1.

10. A computer readable storage medium, storing a computer program, wherein the computer program is executed by a processor to implement the computer-implemented bidding method according to claim 1.

11. Computer equipment, comprising a bidding management system, wherein the bidding management system is configured for:

receiving the values of the optimized bidding configuration parameters obtained by the computer-implemented bidding method according to claim 1; and displaying the bidding configuration parameters on a bidding participant interface of the bidding management system, wherein values of the bidding configuration parameters are the values of the optimized bidding configuration parameters.

12. A computer readable storage medium, storing a computer program, wherein the computer program is executed by a processor to implement the computer-implemented bidding method according to claim 8.

13. A bidding system, comprising:
first computer equipment; and
second computer equipment; wherein
the first computer equipment comprises a memory and a processor, wherein a computer program is stored in the memory, and the computer program is executed by the processor to implement the computer-implemented bidding method according to claim 1;

the second computer equipment comprises a bidding management system, wherein the bidding management system is configured for:

receiving the values of the optimized bidding configuration parameters obtained by the computer-implemented bidding method according to claim 1; and displaying the bidding configuration parameters on a bidding participant interface of the bidding management system, wherein values of the bidding configuration parameters are the values of the optimized bidding configuration parameters.

14. The computer-implemented bidding method according to claim 2, wherein the step of inputting the current basic bidding parameters into the trained CatBoost regression model, and outputting the values of the optimized bidding configuration parameters comprises:

obtaining all combinations of values of the bidding configuration parameters according to the current basic bidding parameters;

outputting, by the trained CatBoost regression model, differences between corresponding first quotes and predicted final quotes based on the combinations; and comparing all the differences between the corresponding first quotes and predicted final quotes to obtain a maximum difference, and obtaining values of the bidding configuration parameters corresponding to the maximum difference to be output as the values of the optimized bidding configuration parameters.

15. The computer-implemented bidding method according to claim 3, wherein the step of inputting the current basic bidding parameters into the trained CatBoost regression model, and outputting the values of the optimized bidding configuration parameters comprises:

obtaining all combinations of values of the bidding configuration parameters according to the current basic bidding parameters;

outputting, by the trained CatBoost regression model, differences between corresponding first quotes and predicted final quotes based on the combinations; and comparing all the differences between the corresponding first quotes and predicted final quotes to obtain a maximum difference, and obtaining values of the bidding configuration parameters corresponding to the maximum difference to be output as the values of the optimized bidding configuration parameters.

16. The computer-implemented bidding method according to claim 4, wherein the step of inputting the current basic bidding parameters into the trained CatBoost regression model, and outputting the values of the optimized bidding configuration parameters comprises:

obtaining all combinations of values of the bidding configuration parameters according to the current basic bidding parameters;

outputting, by the trained CatBoost regression model, differences between corresponding first quotes and predicted final quotes based on the combinations; and comparing all the differences between the corresponding first quotes and predicted final quotes to obtain a maximum difference, and obtaining values of the bidding configuration parameters corresponding to the maximum difference to be output as the values of the optimized bidding configuration parameters.

17. The computer-implemented bidding method according to claim 5, wherein the step of inputting the current basic bidding parameters into the trained CatBoost regression model, and outputting the values of the optimized bidding configuration parameters comprises:

obtaining all combinations of values of the bidding configuration parameters according to the current basic bidding parameters;

outputting, by the trained CatBoost regression model, differences between corresponding first quotes and predicted final quotes based on the combinations; and comparing all the differences between the corresponding first quotes and predicted final quotes to obtain a maximum difference, and obtaining values of the bidding configuration parameters corresponding to the maximum difference to be output as the values of the optimized bidding configuration parameters.

18. The computer-implemented bidding method according to claim 6, wherein the step of inputting the current basic bidding parameters into the trained CatBoost regression model, and outputting the values of the optimized bidding configuration parameters comprises:

obtaining all combinations of values of the bidding configuration parameters according to the current basic bidding parameters;

outputting, by the trained CatBoost regression model, differences between corresponding first quotes and predicted final quotes based on the combinations; and comparing all the differences between the corresponding first quotes and predicted final quotes to obtain a maximum difference, and obtaining values of the bidding configuration parameters corresponding to the maximum difference to be output as the values of the optimized bidding configuration parameters.

19. The computer-implemented bidding method according to claim 8, wherein when an amount of missing information of certain historical data exceeds half, the historical data is deleted; when the amount of missing information of the historical data does not exceed half, the historical data is completed by using an average, a median or a row/column mode of the information of the historical data.

20. The computer-implemented bidding method according to claim 19, wherein the information of the bidding participants comprises at least one selected from the group consisting of a number of the bidding participants, identity information of each of the bidding participants, a first quote offered by each of the bidding participants, and a number of bidding participants without offering a first quote; and the information of the bidding object comprises at least one selected from the group consisting of a name of the bidding object, a bidding place, a number of bidding objects and a preset budget.

* * * * *